United States Patent
Shiraga et al.

(10) Patent No.: US 7,382,121 B2
(45) Date of Patent: Jun. 3, 2008

(54) ROTATIONAL ANGLE DETECTOR FOR DETECTING A ROTATIONAL ANGLE OF A ROTATING BODY

(75) Inventors: Shozoh Shiraga, Osaka (JP); Yusuke Baba, Kanagawa (JP); Yasunori Tomino, Osaka (JP); Masahide Onishi, Fukui (JP); Hiromitsu Noda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/526,314

(22) Filed: Sep. 25, 2006

(65) Prior Publication Data

US 2007/0090830 A1    Apr. 26, 2007

(30) Foreign Application Priority Data

Oct. 20, 2005  (JP)  ............................. 2005-305490
Apr. 3, 2006   (JP)  ............................. 2006-101753

(51) Int. Cl.
*G01B 7/30* (2006.01)

(52) U.S. Cl. ............................. 324/207.25; 324/207.21

(58) Field of Classification Search .................. 324/207.15–207.25; 338/33 H, 32 R; 33/1 PT
See application file for complete search history.

(56) References Cited

U.S. PATENT DOCUMENTS

| | | | | |
|---|---|---|---|---|
| 4,740,690 A | * | 4/1988 | Mosier | 250/231.18 |
| 5,481,188 A | * | 1/1996 | Mizutani | 324/207.25 |
| 5,683,351 A | * | 11/1997 | Kaiser et al. | 601/40 |
| 5,930,905 A | * | 8/1999 | Zabler et al. | 33/1 PT |
| 6,507,188 B1 | * | 1/2003 | Dilger et al. | 324/207.25 |
| 6,630,823 B2 | * | 10/2003 | Tateishi et al. | 324/207.25 |
| 6,804,888 B2 | * | 10/2004 | Nishikawa et al. | 33/1 PT |
| 6,861,837 B1 | | 3/2005 | Shimizu et al. | |
| 6,870,470 B2 | | 3/2005 | Nomura et al. | |
| 6,909,282 B2 | | 6/2005 | Onishi et al. | |
| 7,211,999 B2 | * | 5/2007 | Shiraga et al. | 324/207.25 |
| 2003/0056583 A1 | | 3/2003 | Schodbauer et al. | |
| 2004/0145364 A1 | | 7/2004 | Onishi et al. | |
| 2008/0009993 A1 | * | 1/2008 | Matsuda et al. | 701/41 |

FOREIGN PATENT DOCUMENTS

| | | |
|---|---|---|
| CN | 1504720 A | 6/2004 |
| EP | 1 547 907 A1 | 6/2005 |
| JP | 2005-003625 | 1/2005 |

OTHER PUBLICATIONS

European Search Report for Application No. EP 06 11 9170 dated Feb. 21, 2008.

* cited by examiner

*Primary Examiner*—Jay M Patidar
(74) *Attorney, Agent, or Firm*—RatnerPrestia

(57) ABSTRACT

A rotational angle detector has a rotary body, a first detecting unit rotating in cooperation with the rotary body, a second detecting unit rotating in cooperation with the first detecting unit, and an auxiliary detecting unit rotating in cooperation with the rotary body and the second detecting unit. The rotational angle detector has a first detecting element, a second detecting element, and a controller. The first detecting element detects rotation of the first detecting unit, and the second detecting element detects rotation of the second detecting unit. The controller detects a rotational angle of the rotary body based on a detection signal supplied from the first detecting element and a detection signal supplied from the second detecting element.

4 Claims, 4 Drawing Sheets

ROTATIONAL ANGLE DETECTOR FOR DETECTING A ROTATIONAL ANGLE OF A ROTATING BODY

BACKGROUND OF THE INVENTION

1. Field of the Invention

The present invention relates to a rotational angle detector used for detecting a rotational angle of a steering wheel of a car, for example.

2. Background Art

Recently, functions of cars have been improved, and thus more cars have detected rotational angles of the steering wheels using rotational angle detectors to perform various controls. A conventional rotational angle detector is described with reference to FIG. 4. FIG. 4 is an exploded perspective view of an essential part of the conventional rotational angle detector.

Rotary body 21 has spur gear 21A in its outer periphery, and has engaging part 21B engaging with a steering shaft (not shown) that penetrates its center. Detecting unit 22 has spur gear 22A in its outer periphery, and detecting unit 24 has spur gear 24A in its outer periphery. Spur gear 22A meshes with spur gear 21A, and spur gear 24A meshes with spur gear 22A. Magnet 23A and magnet 25A are mounted to the center of detecting unit 22 and the center of detecting unit 24 by insert molding or the like, respectively. Of rotary body 21, detecting unit 22, and detecting unit 24, the diameter of gear and the number of teeth of rotary body 21 are the largest, those of detecting unit 22 are intermediate, and those of detecting unit 24 are the smallest.

Wiring board 28 disposed over and in substantially parallel with detecting units 22 and 24 has a plurality of wiring patterns (not shown) on its upper and lower surfaces. Magnetic detecting elements 23B and 25B are mounted to wiring board 28 so that they face magnets 23A and 25A, respectively. Wiring board 28 has controller 29 formed of an electronic component such as a microcomputer. Controller 29 is connected to magnetic detecting elements 23B and 25B.

Thus, the rotational angle detector has the following elements:

a first detecting element including magnet 23A and magnetic detecting element 23B;

a second detecting element including magnet 25A and magnetic detecting element 25B; and controller 29.

Controller 29 is connected to an electronic circuit (not shown) of a car body through a connector (not shown) or the like, and the steering shaft penetrates engaging part 21B of rotary body 21. In this way, the rotational angle detector is mounted to a car.

When a driver rotates the steering wheel during driving, rotary body 21 rotates, detecting unit 22 rotates in cooperation with rotary body 21, and detecting unit 24 rotates in cooperation with detecting unit 22. Magnets 23A and 25A also rotate in cooperation with these rotations. Magnetic detecting elements 23B and 25B detect changing magnetic forces of magnets 23A and 25A as detection signals composed of sine and cosine waveforms of voltage. These detection signals have sawtooth data waveforms and are fed into controller 29. Since the number of teeth and rotation speed of detecting unit 22 differ from those of detecting unit 24, respective data waveforms of the detection signals of detecting unit 22 and detecting unit 24 have different cycles and shifted phases with each other.

Controller 29 performs a predetermined calculation based on two different detection signals supplied from magnetic detecting elements 23B and 25B and each number of teeth, and detects the rotational angle of rotary body 21. That is, controller 29 detects the rotational angle of the steering wheel. The detected signals are supplied to the electronic circuit of the car body, and are used for various controls of the car. Such a rotational angle detector is disclosed in Japanese Patent Unexamined Publication No. 2005-3625, for example.

In this conventional rotational angle detector, however, when detecting unit 22 or detecting unit 24 is chipped or broken, controller 29 detects a false rotational angle based on the detection signals from magnetic detecting elements 23B and 25B. In order to address the problem and to attain a long service life by preventing chipping or breakage through strengthening detecting units 22 and 24, the size of detecting units 22 and 24 must be enlarged or a material of high strength must be used.

SUMMARY OF THE INVENTION

A rotational angle detector of the present invention has the following elements:

a rotary body;

a first detecting unit rotating in cooperation with the rotary body;

a second detecting unit rotating in cooperation with the first detecting unit; and an auxiliary detecting unit rotating in cooperation with the rotary body and the second detecting unit.

The rotational angle detector of the present invention has a first detecting element, a second detecting element, and a controller. The first detecting element detects the rotation of the first detecting unit, and the second detecting element detects the rotation of the second detecting unit. The controller detects the rotational angle of the rotary body based on a detection signal from the first detecting element and a detection signal from the second detecting element. In this simple structure, three detecting units, namely the first detecting unit, the second detecting unit, and the auxiliary detecting unit, always rotate in cooperation with each other, so that the controller can precisely detect the rotational angle of the rotary body even when each detecting unit is chipped or broken a little.

DETAILED DESCRIPTION OF THE INVENTION

Figure 1:
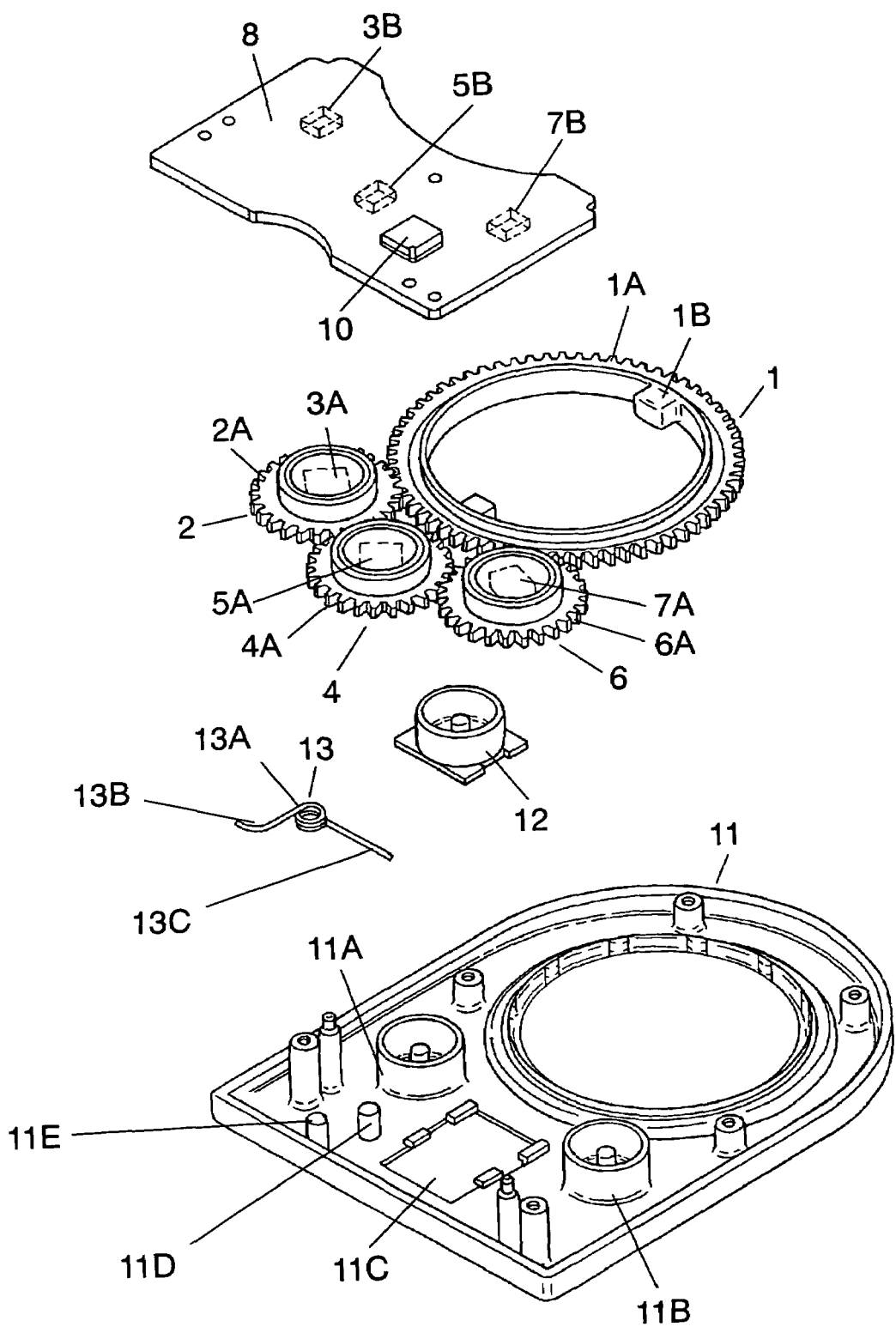
FIG. 1 is an exploded perspective view of an essential part of a rotational angle detector in accordance with an exemplary embodiment of the present invention.
Figure 2:
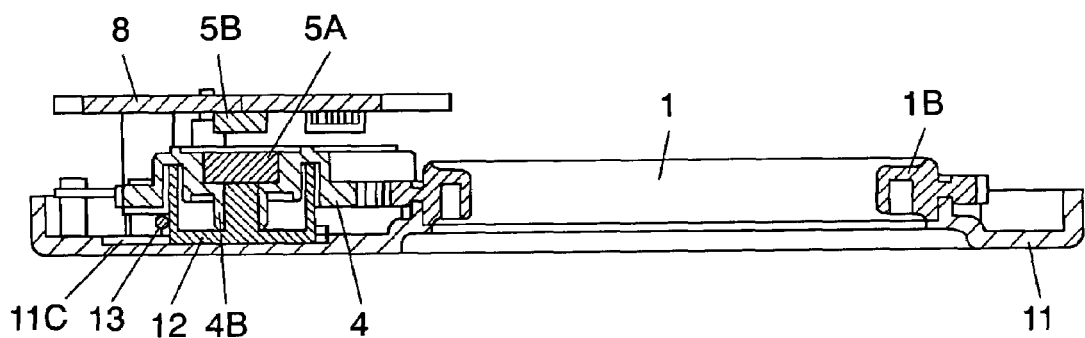
FIG. 2 is a sectional view of the essential part of the rotational angle detector in accordance with the exemplary embodiment of the present invention.

FIG. 1 is an exploded perspective view of an essential part of a rotational angle detector in accordance with an exemplary embodiment of the present invention. FIG. 2 is a sectional view of the essential part. The rotational angle detector has rotary body 1, first detecting unit 2 (hereinafter referred to as "detecting unit 2"), second detecting unit 4 (detecting unit 4), auxiliary detecting unit 6 (detecting unit 6), and wiring board 8.

Rotary body 1 has spur gear 1A in its outer periphery, and has engaging part 1B engaging with a steering shaft (not shown) that penetrates its center. Detecting unit 2 has spur gear 2A in its outer periphery, and detecting unit 4 has spur gear 4A in its outer periphery. Detecting unit 6 has spur gear 6A in its outer periphery. Spur gear 2A is meshed with spur gear 1A, spur gear 4A is meshed with spur gear 2A, and spur gear 6A is meshed with spur gear 1A and spur gear 4A. All of rotary body 1 and detecting units 2, 4 and 6 are made of insulating resin or metal. The diameter and the number of teeth of the gear in rotary body 1 are the largest, those in detecting unit 2 are equal to those in detecting unit 6, and those in detecting unit 4 are the smallest. For example, the number of teeth of spur gear 1A is 65, that of spur gear 2A and that of spur gear 6A are 26, and that of spur gear 4A is 25.

First magnet 3A (hereinafter referred to as "magnet 3A"), second magnet 5A (magnet 5A), and auxiliary magnet 7A (magnet 7A) are mounted to the centers of detecting unit 2, detecting unit 4, and detecting unit 6 by insert molding or the like, respectively. Wiring board 8 disposed over and in substantially parallel with detecting units 2, 4 and 6 has a plurality of wiring patterns (not shown) on its upper and lower surfaces. Magnetic detecting elements 3B, 5B and 7B such as anisotropic magnetic resistance (AMR) elements are mounted to wiring board 8 so that they face magnets 3A, 5A and 7A, respectively. A first detecting element is composed of magnet 3A and magnetic detecting element 3B, which face each other. A second detecting element is composed of magnet 5A and magnetic detecting element 5B, which face each other. An auxiliary detecting element is composed of magnet 7A and magnetic detecting element 7B, which face each other.

Wiring board 8 has controller 10 composed of an electronic component such as a microcomputer. Controller 10 is connected to magnetic detecting elements 3B, 5B and 7B.

Cylinder part 11A disposed in case 11 made of insulating resin rotatably holds detecting unit 2, cylinder part 11B rotatably holds auxiliary detecting unit 6, and holder 12 made of insulating resin rotatably holds detecting unit 4. Holder 12 is movably mounted to sliding groove 11C in the bottom surface of case 11. Case 11 has a hole into which the steering shaft engaging with engaging part 1B of rotary body 1 is inserted.

Spring 13 made of a wire includes wound central part 13A, left end part 13B and right end part 13C, both extends from central part 13A. Central part 13A is inserted to and supported by holder 11D which projects from case 11 while spring 13 is in a slightly flexible state. Left end part 13B is fitted on projection 11E, and right end part 13C is contact with a side face of holder 12. In this structure, spring 13 presses detecting unit 4 onto detecting unit 2 and detecting unit 6. In other words, spring 13 is an elastic body for pressing detecting unit 4 onto detecting unit 2 and detecting unit 6.

Case 11 and a counter case (not shown) that faces case 11 are combined together into a rotational angle detector of the present embodiment having the above-described structure.

Controller 10 is connected to an electronic circuit (not shown) of a car body through a connector (not shown) or the like, and the steering shaft (not shown) penetrates engaging part 1B of rotary body 1. The rotational angle detector is thus mounted to a car.

During driving, that is, during the rotational angle detector having this structure is supplied with electrical power, a driver rotates the steering wheel, whereby rotary body 1 rotates. Detecting units 2, 4 and 6 also rotate in cooperation with rotary body 1. Magnets 3A, 5A and 7A also rotate in cooperation with rotations of the detecting units. Magnetic detecting elements 3B, 5B and 7B detect changing magnetic forces of magnets 3A, 5A and 7A as detection signals composed of sine and cosine waveforms of voltage.

These detection signals have sawtooth data waveforms and are fed into controller 10. The number of teeth and rotation speed of detecting unit 2 and those of detecting unit 6 are equal to each other, but differ from those of detecting unit 4. Therefore, the data waveform of the detection signal from detecting unit 4 has a cycle and phase different from the cycles and phases of detecting units 2 and 6.

Controller 10 performs a predetermined calculation based on two different detection signals from detecting units 2 and 4 and the number of teeth of each of them, and detects a rotational angle of rotary body 1, whereby detecting the rotational angle of the steering wheel. The detected signals are supplied to the electronic circuit of the car body, and are used for various controls of the car. A detailed method of calculating the rotational angle is disclosed in Japanese Patent Unexamined Publication No. 2005-3625, for example.

Detecting unit 6 is meshed with rotary body 1 and detecting unit 4, so that three detecting units rotate in cooperation with each other. Even if any of the detecting units is chipped or broken a little, the detecting units can rotate in cooperation with each other. For example, even if the mesh part of detecting unit 4 with detecting unit 2 is chipped, detecting unit 4 is rotated with the mesh part of it with detecting unit 6. When the chipped part of the mesh part of detecting unit 4 meshes with detecting unit 6, a non-chipped mesh part of detecting unit 4 meshes with detecting unit 2.

Thus, even if any of the gears of the detecting units is chipped or broken, these rotations are always performed in cooperation with each other, and controller 10 can rightly detect the rotational angle of rotary body 1. Therefore, each detecting unit does not need to be enlarged in size or made of an especially strong material. The rotational angle detector of the present embodiment has a simple structure having additional auxiliary detecting unit 6, and does not need to be enlarged. The rotational angle detector of the present embodiment can be therefore made of a relatively inexpensive material, and has a long service life.

As described above, magnet 7A and magnetic detecting element 7B for detecting rotation of detecting unit 6 are preferably disposed. Controller 10 can detect a failure by detecting difference between detection signals supplied from magnetic detecting elements 3B and 7B. For example, on the occasion of such failure of displacement between rotary body 1 and detecting unit 2 or displacement between rotary body 1 and detecting unit 6 occurs, even if a detection signal is supplied from either one of magnetic detecting elements 3B and 7B, no detection signal is supplied from the other. Controller 10 can detect the failure. Therefore, the detection of a false rotational angle can be effectively avoided.

More preferably, controller 10 detects difference between detection signals from magnetic detecting elements 5B and 7B. Even if the displacement involving detecting unit 2 occurs as described above, controller 10 can detect the rotational angle of rotary body 1 based on the detection signal that is supplied from magnetic detecting element 7B in accordance with the rotation of detecting unit 6 which is not involved in the displacement.

As described above, preferably, spring 13 as an elastic body is disposed. Spring 13 indirectly presses detecting unit 4 onto detecting unit 2 and detecting unit 6 by pressing holder 12 to which detecting unit 4 is mounted. Therefore, rotation is performed without slight clearance, so-called backlash, between the gears of detecting units, and hence error due to this clearance does not occur. The rotational angle can be thus detected with high accuracy.

Figure 3:
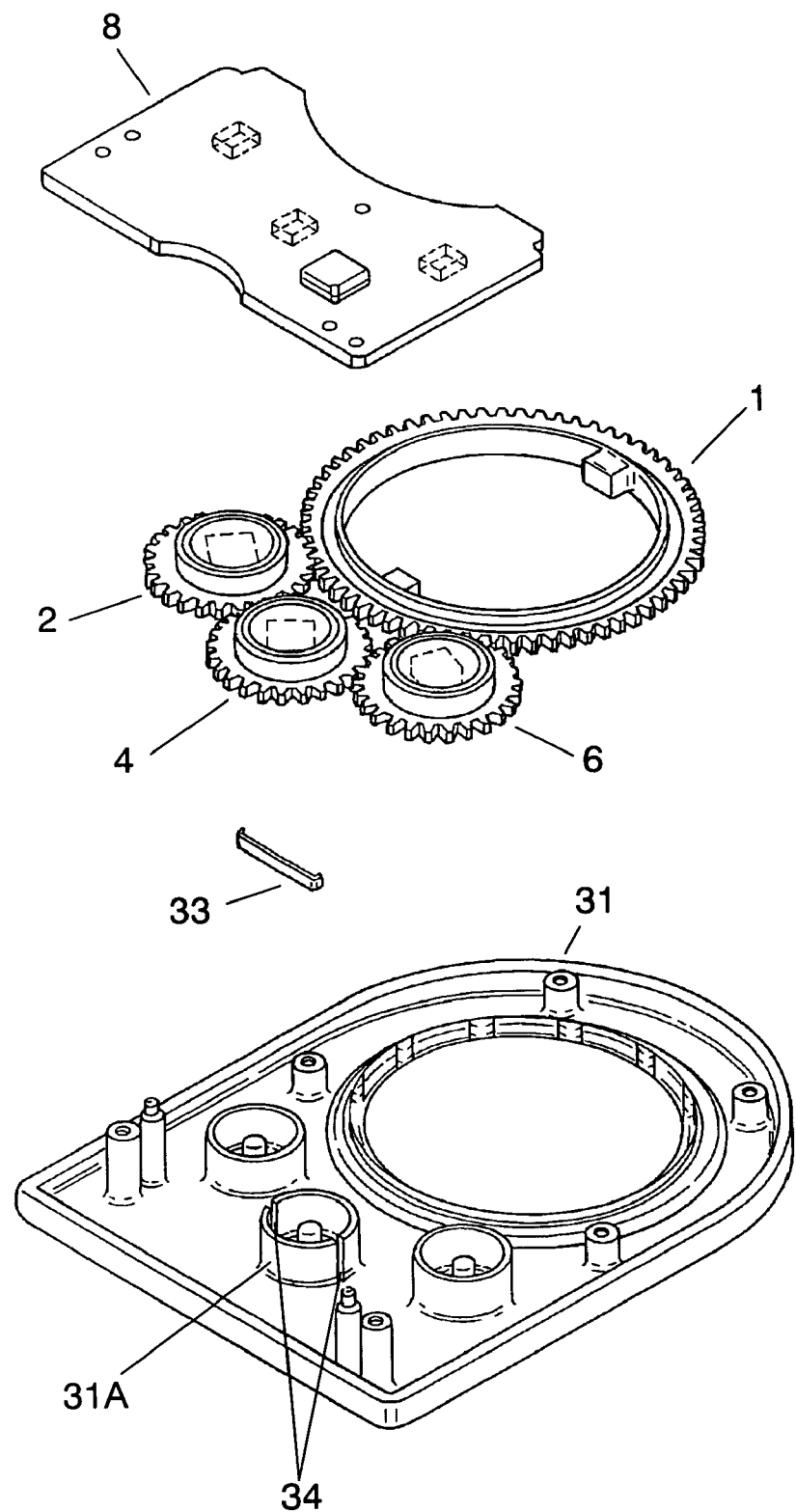
FIG. 3 is an exploded perspective view of another essential part of the rotational angle detector in accordance with the exemplary embodiment of the present invention.
Figure 4:
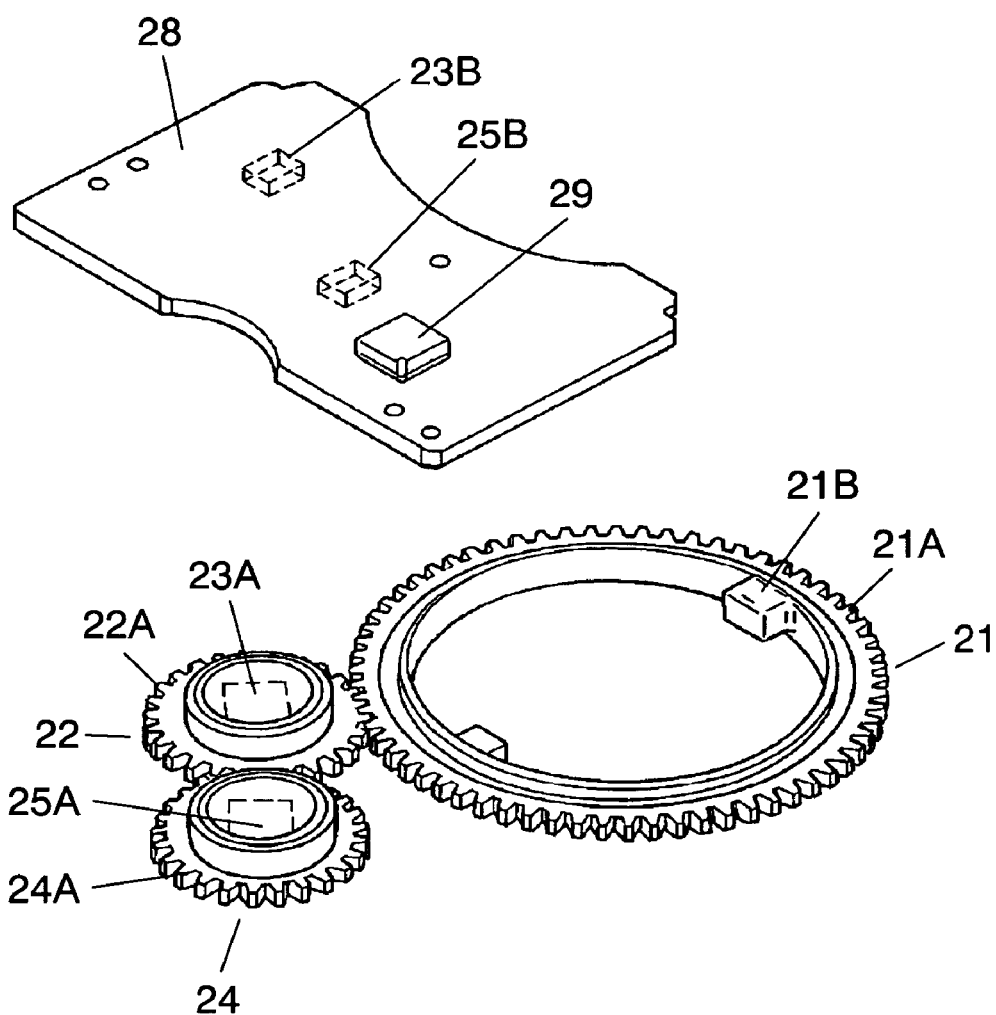
FIG. 4 is an exploded perspective view of an essential part of a conventional rotational angle detector.

Next, an elastic body other than spring 13 for pressing detecting unit 4 onto detecting unit 2 and detecting unit 6 is described. FIG. 3 is an exploded perspective view of another essential part of the rotational angle detector in accordance with the exemplary embodiment of the present invention.

In this structure, cylinder part 31A is disposed in 31, and holds detecting unit 4 rotatably. Flat spring 33 is mounted to grooves 34 of cylinder part 31A in a slightly flexible state. Spring 33 presses the side face of bearing part 4B that is disposed on the lower face side of detecting unit 4 shown in FIG. 2, thereby pressing detecting unit 4 onto detecting unit 2 and detecting unit 6. In other words, spring 33 directly presses detecting unit 4 onto detecting unit 2 and detecting unit 6. Thus, detecting unit 4 slightly moves within the clearance range between bearing part 4B of detecting unit 4 and the shaft in cylinder part 31A. Except this feature, the structure is the same as that in FIG. 1. In this structure, also, spring 33 has an effect similar to that of spring 13.

Gears are formed in the outer peripheries of rotary body 1 and detecting units 2, 4 and 6 in the rotational angle detectors of FIG. 1 and FIG. 3; however, the present invention is not limited to this. Besides the gears, uneven parts or high-friction parts capable of transmitting rotation may be formed in the outer peripheries of rotary body 1 and detecting units 2, 4 and 6, and they are rotated in cooperation with each other.

The rotational angle detector of the present invention can detect the rotational angle with high accuracy, exhibiting high reliability with an inexpensive and simple structure. The rotational angle detector is useful for applications such as detection of the rotational angle of the steering wheel of a car.

What is claimed is:

1. A rotational angle detector comprising:
   a rotary body;
   a first detecting unit in contact with the rotary body, the first detecting unit rotating in cooperation with the rotary body;
   a first detecting element for detecting rotation of the first detecting unit;
   a second detecting unit apart from the rotary body, and in contact with the first detecting unit, the second detecting unit rotating in cooperation with the first detecting unit;
   a second detecting element for detecting rotation of the second detecting unit;
   an auxiliary detecting unit in contact with the rotary body and the second detecting unit, the auxiliary detecting unit rotating in cooperation with the rotary body and the second detecting unit; and
   a controller for detecting a rotational angle of the rotary body based on a detection signal from the first detecting element and a detection signal from the second detecting element.

2. The rotational angle detector according to claim 1, further comprising an auxiliary detecting element for detecting rotation of the auxiliary detecting unit,
   wherein the controller detects a failure in one of the first detecting unit and the auxiliary detecting unit based on difference between a detection signal from the auxiliary detecting element and a detection signal from the first detecting element.

3. The rotational angle detector according to claim 2,
   wherein the controller detects the rotational angle of the rotary body based on a detection signal from the auxiliary detecting element and a detection signal from the second detecting element when the controller detects a failure in the first detecting unit.

4. The rotational angle detector according to claim 1, further comprising an elastic body for pressing the second detecting unit onto the first detecting unit and the auxiliary detecting unit.

* * * * *